Oct. 20, 1964     B. M. RONAY     3,153,542
BI-METAL PISTON RINGS
Original Filed March 20, 1956     2 Sheets-Sheet 1

INVENTOR
BELA M. RONAY

BY
B. L. Zangwill
ATTORNEYS

Oct. 20, 1964     B. M. RONAY     3,153,542
BI-METAL PISTON RINGS
Original Filed March 20, 1956     2 Sheets-Sheet 2
Micro-Structure of Cast Iron Piston Ring
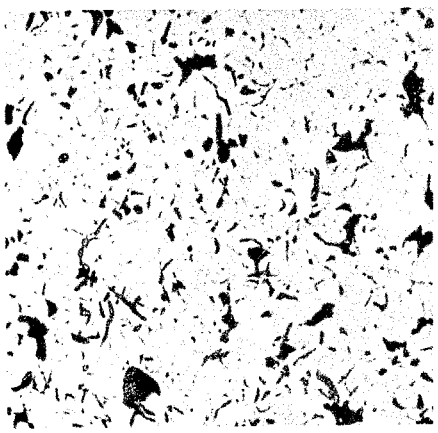 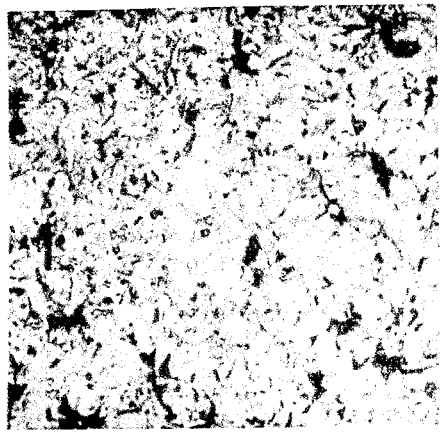
Fig. 4A                  Fig. 4B
UNETCHED CONDITION        ETCHED CONDITION
Micro-Structure of Bi-Metal Piston Ring
 
Fig. 5A                  Fig. 5B
UNETCHED CONDITION        ETCHED CONDITION
*INVENTOR*
BELA M. RONAY
BY     *B. L. Zangwill*
                     *ATTORNEY*

United States Patent Office 3,153,542
Patented Oct. 20, 1964

3,153,542
BI-METAL PISTON RINGS
Bela M. Ronay, 154 Conduit St., Annapolis, Md.
Original application Mar. 20, 1956, Ser. No. 585,600, now Patent No. 3,000,080, dated Sept. 19, 1961. Divided and this application May 3, 1961, Ser. No. 107,594
5 Claims. (Cl. 277—235)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 585,600, filed March 20, 1956, and entitled "Method of Making Welded Bi-Metal Piston Rings," now issued as U.S. Patent No. 3,000,080.

This invention relates to piston rings and particularly to improvements in metallic piston rings, such as are adapted for use in internal combustion engines, and to a novel process of manufacturing such piston rings.

The function of piston rings in internal combustion engines is to seal the annular clearance space between the cylinder wall or liner and the piston. The heat of combustion of fuel introduced in the space above the piston quickly heats the small volume of the piston rings and they expand against the wall of the cylinder liner. This expanded condition alternates with contraction of the rings during the strokes of a four cycle engine and of a two-stroke engine. In the latter, contraction is aided by scavenger air introduced in the cylinder after the combustion products are expelled. Accordingly, piston rings are subject to wear during their travel up and down the cylinder and they expand and contract, hinge-like, following each combustion period.

The standard material from which piston rings are made is cast iron, because it offers the best wear resistance against the cylinder liners. However, the low fatigue and high creep values of cast iron are responsible for the limited life of piston rings, for example, in high compression, high temperature Diesel engines. Design of Diesel engines compensates somewhat for this shortcoming of such piston rings by arrangements which permit quick disassembling of the engine head so that the piston rings can be replaced within short outage periods. In free piston engines, replacement of piston rings requires complete disassembling of the engine, causing extended out of use periods. Because pressures and temperatures in free piston engines are higher than in crankshaft type Diesels, the life of the presently available all-cast-iron piston rings is even shorter than in conventional Diesel engines, requiring more frequent replacements. This causes unduly high percentage of outage periods.

It is therefore a principal object of this invention to provide a piston ring which overcomes the above mentioned defects of prior piston rings.

A further object of this invention is to provide long life piston rings.

A more specific object of this invention is to provide a piston ring incorporating desirable features of an all cast iron piston ring while eliminating undesirable characteristics thereof.

Another specific object of this invention is to provide a piston ring incorporating desirable features of a steel piston ring while eliminating undesirable characteristics thereof.

The above and other objects and advantages of the invention will be more apparent from a perusal of the following specification and accompanying drawings.

Specifically, the above objects of the invention are accomplished by the use of a novel layered bi-metal combination comprising a core of low alloy steel and a welded-on overlay of cast iron. The core of alloy steel is relatively tough and resilient, and the overlay of cast iron is relatively soft and brittle.

In the drawings:

FIG. 4A is a photomicrograph of a cross-section of a conventional cast iron piston ring in unetched condition;

FIG. 4B is a photomicrograph of the same specimen, as in FIG. 4A, in etched condition;

FIG. 5A is a photomicrograph of a cross-section of a bi-metal piston ring in accordance with this invention, in unetched condition; and FIG. 5B is a photomicrograph of the same specimen, as in FIG. 5A, in etched condition.

The above photomicrographs are all taken at the same magnification, that is, 100 diameters.

Figure 1:
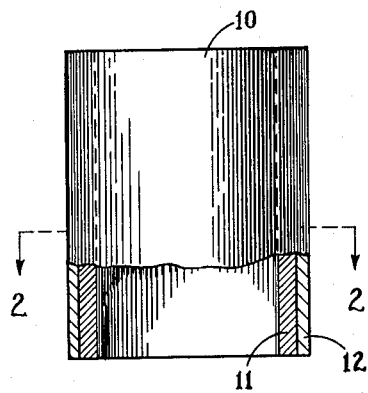
FIG. 1 is a side elevation, partly in section, of a built-up, bi-metal cylinder, in accordance with this invention, from which the piston rings are cut.
Figure 2:
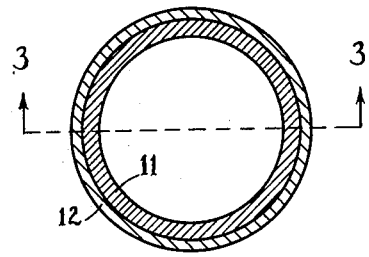
FIG. 2 is a transverse section taken on line 2—2 of FIG. 1.
Figure 3:
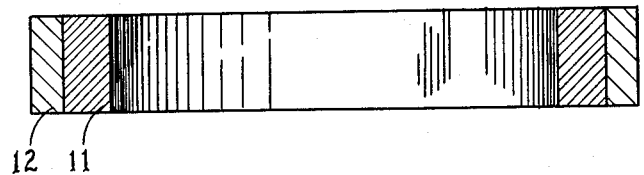
FIG. 3 is a vertical section on an enlarged scale, through a finished bi-metal piston ring in accordance with this invention, taken substantially on line 3—3 of FIG. 2.

Referring now to FIG. 1 of the drawings, 10 designates a built-up, bi-metal cylinder comprising a core 11 and a welded-on overlay 12. The core of the cylinder comprises an alloy steel whose endurance value at the applied temperature range permits unlimited stress reversals developing in the hinge-like alternations of the finished piston ring, and whose low creep at the service temperature permits the development and maintenance of the required stress to produce the hinge-like movement during the life of the ring. It has been found in practice that low alloy steels of 1½ to 2½% chromium and ½ to 1% molybdenum content are excellent metals for the core 11. For exceptional cases, the core material may be chromium nickel type austenitic steel.

The overlay 12 comprises a welded-on layer, or layers as desired, of cast iron. The composition and microstructure of the cast iron overlay, as to quality and size of free graphite particles, is comparable with those prevailing in conventional, all cast iron piston rings. Such micro-structure is developed by a combination of selection of the composition of the cast iron and the welding technique used, as described hereinafter.

In practicing the process my Patent No. 3,000,080, of which this application is a division, to assure that the bond between the outer layer of cast iron and the alloy steel core of the ring remains intact during the life of the ring, the cast iron is applied as a welded-on overlay. The weld rod, which preferably consists of total carbon, 3.90%, silicon, 3.10% max., manganese, 0.80% max., phosphorus, 0.80% max., sulphur, 0.12% max., and the balance substantially iron, is fused onto the core by an acetylene flame or other applicable welding process; the welds comprising continuous overlapping beads built up into layers forming what might be said to be a bonding layer. To obtain in the cast iron overlay the desired microstructure as to size, quantity and dispersion of the free graphite particles and having an overwhelmingly pearlite matrix, the cooling rate is regulated in the course of welding.

This regulation consists of preheating the core to be overlaid to 700° to 900° F. range and maintaing this temperature during deposition of the cast iron overlay. Further, to prevent development of preferential cooling of the overlay and thus assure uniformity of dispersion of the free graphite flakes therein, the thickness of each layer deposited is restricted. In this respect, the heat block of the preheated mass of the core tube is of further assistance. The abundance of the pearlite constituents thus produced in the slowly cooled assembly makes the overlay soft so that in most instances heat treatment after application of the overlay is not needed.

After the cast iron overlay is thus built-up on the cylindrical core, the outer surface of the cylinder is machined to the desired diameter and finish as shown in FIG. 1, after which, individual rings are cut from the cylinder by any suitable manner as to form C-type piston rings.

Thus, it is seen, by this invention, there is provided a novel bi-metal piston ring having a cast iron surface attached to a low alloy steel core by welding, wherein the low alloy steel chosen is the type which retains a high percentage of its room temperature yield and fatigue strength at service temperatures, wherein the application of cast iron by welding in the manner of this invention assures 100% bonding between the core material and the overlay, and wherein the isothermal post heat treatment develops 100% pearlite, the desirable quality, in the cast iron without affecting the desirable properties of the low alloy steel core material. This structure is clearly manifest in the photomicrograph of FIG. 5B, wherein the upper zone is the cast iron overlay, the lower zone is the base metal, low alloy steel, and the intermediate area is the bonding or decarbonized zone. The life of the ring thus becomes a function of wear of the cast iron overlay only. The fineness and uniform dispersal of the free graphite particles in the welded-on cast iron overlay were found to give the new piston ring 25% more wear life than the conventional all cast iron ring.

It should be understood, of course, that the foregoing relates to only a preferred embodiment of the invention and that numerous modifications or alterations may be made therein without departing from the spirit and the scope of the invention as set forth in the appended claims.

What is claimed is:

1. A resilient bi-metal piston ring having an inner or piston engaging surface of resilient low chrome molybdenum steel and an outer or cylinder wall engaging surface of weld deposited cast iron having a substantially 100% pearlitic state.

2. A resilient bi-metal piston ring as set forth in claim 1 wherein the pearlite state of the outer cast iron surface results from the weld deposition of said cast iron.

3. A resilient bi-metal piston ring having an inner or piston engaging surface of substantially austenitic structure and an outer or cylinder engaging surface of weld deposited substantially pearlitic structure having substantial uniformity of dispersion of free graphite flakes therein.

4. A resilient bi-metal piston ring having:
   (a) a core of steel;
   (b) an outermost layer of weld deposited iron; and
   (c) a bounding layer between said core and said outermost layer;
   (d) said bounding layer between the core and the outermost layer being essentially 100%.

5. A piston ring as defined in claim 4 wherein said outer layer of cast iron has a substantially pearlitic structure having substantially uniformity of dispersion of free graphite flakes therein.

References Cited in the file of this patent

UNITED STATES PATENTS

| | | |
|---|---|---|
| 1,260,009 | Miles | Mar. 19, 1918 |
| 1,528,771 | Jackson | Mar. 10, 1925 |
| 1,973,263 | Mitchell et al. | Sept. 11, 1934 |
| 2,052,160 | Barnes | Aug. 25, 1936 |
| 2,404,616 | Bramberry | July 25, 1946 |

FOREIGN PATENTS

| | | |
|---|---|---|
| 16,666 | Great Britain | Dec. 18, 1913 |
| 471,517 | Great Britain | Sept. 6, 1937 |